Nov. 6, 1945.    A. B. MacNEILL    2,388,362
DRILLING MACHINE
Filed Dec. 30, 1944    2 Sheets—Sheet 2
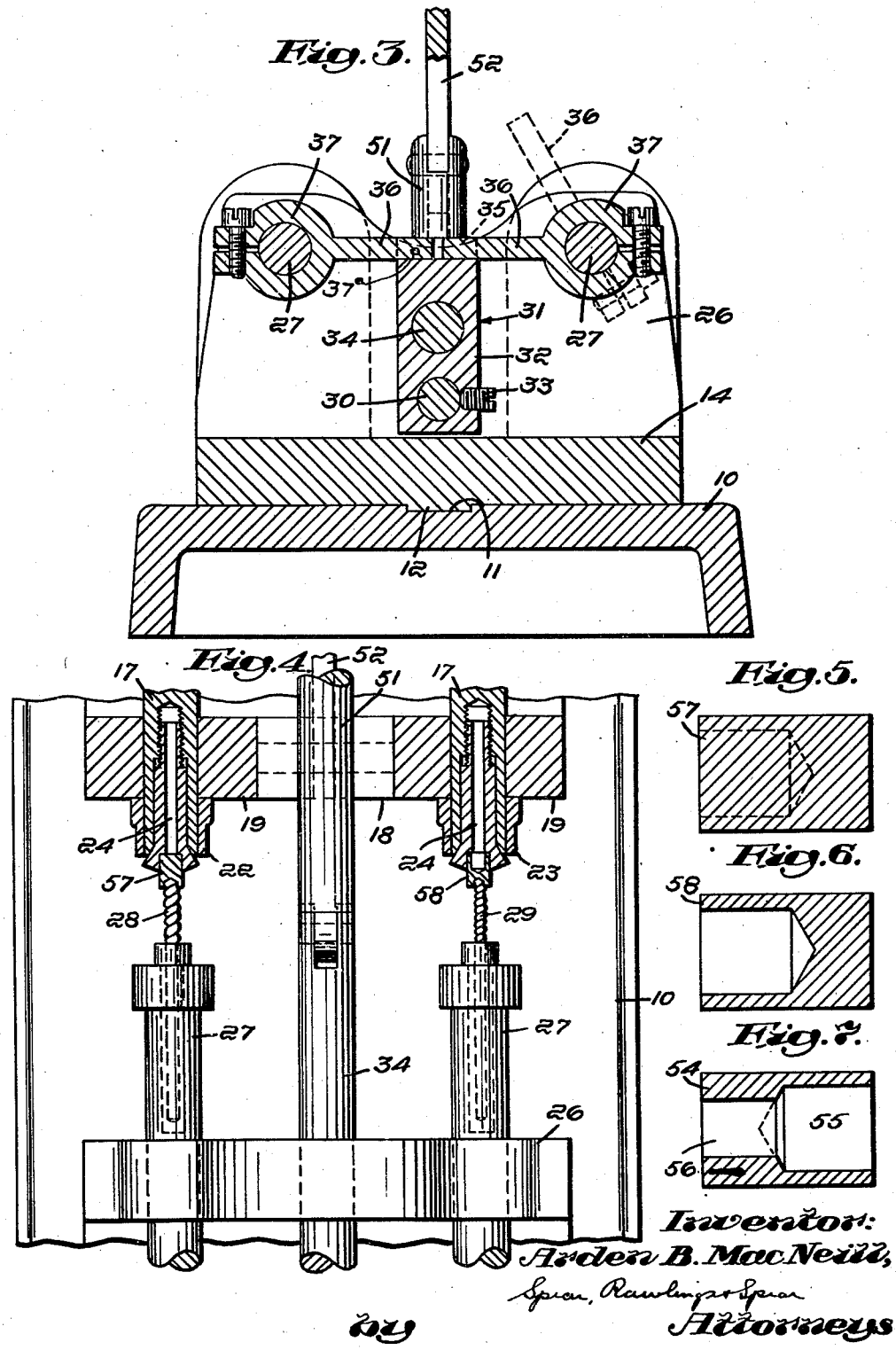

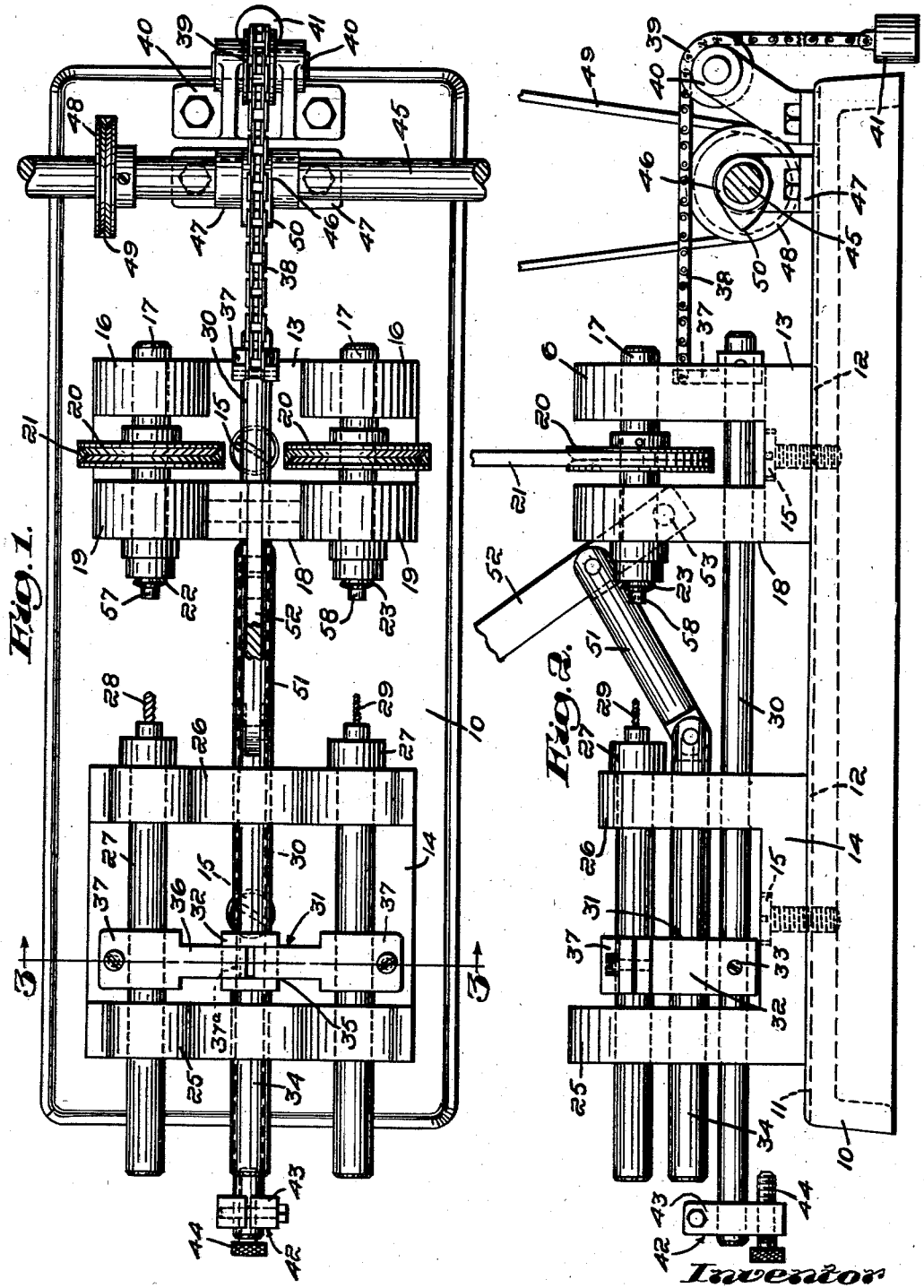

Patented Nov. 6, 1945

2,388,362

UNITED STATES PATENT OFFICE 2,388,362

DRILLING MACHINE

Arden B. MacNeill, Waltham, Mass., assignor to said Arden B. MacNeill and Harris Harold MacNeill, Waltham, Mass., as joint tenants Application December 30, 1944, Serial No. 570,709

2 Claims. (Cl. 77—22)

My present invention relates to apparatus for simultaneously drilling a plurality of blanks and particularly to such apparatus for drilling a first bore of desired diameter and depth in one end of a blank to partially form an article and simultaneously drilling a connecting bore of different diameter in the other end of another blank in which such a first bore has been previously drilled.

In accordance with my invention, I provide efficient apparatus for effecting such drilling operations accurately and economically. My apparatus comprises a base having a pair of spaced supports. One of the supports rotatably carries work holders for the blanks and the other support slidably guides drill holders in axial alinement with the work holders.

An actuator, slidably mounted in each of the supports, is connected to the work holders and is under the control of means effective to advance the drills towards the work holders through a stroke limited to effect the drilling of bores of desired depth. I provide manually operative means to position or hold the drill holders inoperatively against the influence of the advancing means and I also employ a rotatable cam in control of the actuator to slide the actuator, at desired intervals, against the influence of the advancing means to provide clearing strokes for the drills.

In the accompanying drawings, I have shown an illustrative embodiment of my invention from which these and other of its novel features and advantages will be readily apparent.

In the drawings:

Fig. 1 shows apparatus in accordance with my invention in plan view.

Fig. 2 is a side view of the apparatus of Fig. 1.

Fig. 3 is a section on an enlarged scale, along the lines 3—3 of Fig. 1.

Fig. 4 shows, in a fragmentary plan view, the work holders and the drill holders operatively positioned with the blanks and the work holders being sectioned, and Figs. 5, 6, and 7 are enlarged sections showing, respectively, a blank, a blank drilled at one end to partially make the article, and a completed article.

Apparatus in accordance with my invention consists of a base 10 having a groove 11 to receive the ribs 12 of the supports 13 and 14 which are anchored in spaced relation by screws 15.

The support 13 has at one end a pair of spaced ears 16 rotatably supporting one end of the shafts 17. At its other end, the support 13 has a wall 18 terminating in a pair of spaced ears 19 through which the other end of the shafts 17 extend. Between the spaced ears 16 and 19 is a pulley 20 fast on each of the shafts 17 adapted to be connected to any suitable drive, not shown, as by a common belt 21. The shafts 17 are provided with work holders 22 and 23 each of which has a drill receiving passage 24. See Fig. 4.

The support 14 has a pair of spaced ends 25 and 26 slidably supporting drill holders 27 to support drills 28 and 29 in axial alinement with the work holders 22 and 23 respectively. In accordance with my invention, I provide an actuator 30 slidably supported by the wall 18 of the support 13 and the ends 25 and 26 of the support 14 and having a connection, generally indicated at 31, with both of the drill holders 27.

The connection 31 may conveniently comprise a block 32 locked to the actuator 30 by a set screw 33 and slidably receiving the rod 34 slidably supported in the ends 25 and 26 of the support 14. I form the upper surface of the block 32 with a slotted seat 35 which receives the ends 36 of the latches 37 clamped to the drill holders 27. By this construction, either drill holder 27 may be quickly and easily detached from the actuator 30 by raising the ends 36 of the latches 37. The latch on the holder for the drill 28 is locked to the block 32 as by a pin 37a to maintain its connection with the block 32 against the rotative influence of the work holders, both of which rotate in the same direction.

The other end of the actuator 30 has a bracket 37 to which is fastened one end of a chain 38. The chain 38 is trained over a pulley 39 mounted in brackets 40 on the base 10 and to its other end is attached a weight 41 urging the drill holders 27 towards the rotating work holders 22 and 23. Movement of the drill holders 27 is limited by an adjustable stop indicated generally at 42. The stop 42 may conveniently comprise a bracket 43 clamped on the end of the actuator 30. A screw 44, threaded through the bracket 43, engages the adjacent surface of the end 25 of the bracket 14 to limit the depth of the bore established by the advancement of the drills 28 and 29 under the influence of the weight 41.

In accordance with my invention, I journal a shaft 45 for a cam 46 in supports 47 on the base 10. The shaft 45 has a pulley 48 adapted to be connected to any suitable driving means, not shown, as by a belt 49. The cam 46 has a camming portion 50 disposed to engage the adjacent end of the actuator 30 when advanced by the weight 41 so that the drills 28 and 29 have advanced into the work. By this, the actuator 30 is backed against the influence of the weight 41 to impart to the drills 28 and 29 clearing strokes at regular intervals.

I also have indicated manually operable means for backing the drills away from the work or for holding the drills in an inoperative position. As will be apparent from Fig. 2, one end of the rod 34 is disposed to engage with the upper end of the bracket 43 on the adjacent end of the actuator 30. The other end of the rod 34 is connected by a link 51 to a manually operable lever 52 pivotally mounted to the wall 18 intermediate the ears 19 as at 53.

The operation of apparatus in accordance with my invention will be readily apparent. In Fig. 7, I have shown a finished article at 54 that well illustrates the operation of my apparatus and its advantages. The article 54 has a bore 55 in one of its ends with which a bore 56 of smaller diameter in the other end is connected.

Such an article is formed from a blank 57 (Fig. 5) which is positioned in the work holder 22 with the drills held in their inoperative position. The lever 52 is released, and the weight 41 advances the actuator 30 to advance the drill 28 against the rotating blank 57. As the drill 28 advances into the blank, it is periodically reciprocated by engagement of the cam portion 50 with the actuator 30 to provide clearing strokes. The depth of the bore is limited by engagement of the stop 42 with the end 25 which asserts the advancement of the actuator under the influence of the weight 41.

The operator then positions the drills inoperatively and removes the partially made article 58, see Fig. 6. The article 58 is reversed and positioned in the work holder 23 with its undrilled end exposed and a new blank 57 is locked in the work holder 22. The operator then releases the handle 52 to permit the drills 28 and 29 to come against the rotating blank 57 and the partly completed article 58, see Fig. 4, so that at the end of the stroke, the operator will have a completed article and a partially completed article to replace it.

In practice, the larger bore is formed first and the smaller drill 29 is disposed even with or set back slightly relative to the larger drill 28. By this, I minimize breakage since the smaller drill 29 never receives the full drilling pressure.

From the foregoing, it will be apparent that I have provided simple and easily operated apparatus well adapted to effect the accurate drilling of a plurality of blanks.

What I therefore claim and desire to secure by Letters Patent is:

1. Apparatus for simultaneously drilling a pair of blanks, said apparatus comprising a base, first and second spaced supports on said base, a pair of work holders for said blanks rotatably supported by said first support, drill holders slidably supported by said second support in axial alinement with said work holders, an actuator slidably guided by both of said supports, a block having a transverse groove in its top surface fast on said actuator, latches on said drill holders seated in said groove to detachably connect said drill holders thereto, means in control of said actuator to advance said drill holders towards said work holders, means on said actuator to limit the movement of said actuator under the influence of said advancing means to limit the depth of the bores, a member slidably mounted on said second support and said block, and a manually operable toggle pivotally connected to said member and said first support to engage with said limiting means to carry said actuator against the influence of said advancing means.

2. Apparatus for simultaneously drilling a pair of blanks, said apparatus comprising a base, a pair of spaced supports on said base, a pair of work holders for said blanks rotatably supported by one of said supports, drill holders slidably supported by the other of said supports in axial alinement with said work holders, an actuator slidably guided by both of said supports, means connecting said actuator to said drill holders comprising a block fast on the actuator, the upper surface of the block having a transverse groove and a latch clamped to each of the drill holders seated in the transverse groove to be disengaged therefrom by partial rotation of the drill holders, and means to lock one of the latches to the block so that rotation of the work holders in the same direction is not operative to release the locked latch, means in control of said actuator to advance said drill holders towards said work holders, means to limit the movement of said actuator under the influence of said advancing means to limit the depth of the bores, and operator controlled means to carry said actuator against the influence of said advancing means to position said drill holders remote from said work holders.

ARDEN B. MacNEILL.